United States Patent
Rosenhagen et al.

(10) Patent No.: US 10,190,650 B2
(45) Date of Patent: Jan. 29, 2019

(54) COMPENSATING OSCILLATION DEVICE

(71) Applicant: AIM INFRAROT-MODULE GMBH, Heilbronn (DE)

(72) Inventors: Carsten Rosenhagen, Brackenheim (DE); Ingo Ruehlich, Heilbronn (DE)

(73) Assignee: AIM INFRAROT-MODULE GMBH, Heilbronn (DE)

( * ) Notice: Subject to any disclaimer, the term of this patent is extended or adjusted under 35 U.S.C. 154(b) by 0 days.

(21) Appl. No.: 14/898,796

(22) PCT Filed: Jun. 18, 2014

(86) PCT No.: PCT/EP2014/001664
§ 371 (c)(1),
(2) Date: Dec. 16, 2015

(87) PCT Pub. No.: WO2014/206542
PCT Pub. Date: Dec. 31, 2014

(65) Prior Publication Data
US 2016/0153512 A1    Jun. 2, 2016

(30) Foreign Application Priority Data

Jun. 26, 2013 (DE) .................. 10 2013 010 655
Jul. 17, 2013 (DE) .................. 10 2013 011 928

(51) Int. Cl.
*F16F 7/104* (2006.01)
*F16F 9/504* (2006.01)
*F16F 7/116* (2006.01)

(52) U.S. Cl.
CPC .............. *F16F 7/104* (2013.01); *F16F 7/116* (2013.01); *F16F 9/504* (2013.01)

(58) Field of Classification Search
CPC .......... F16F 1/326; F16F 7/116; F16F 7/1011; F16F 2222/10; F16F 2230/0052;
(Continued)

(56) References Cited

U.S. PATENT DOCUMENTS 2,896,447 A * 7/1959 Phillips .................... B06B 3/00
267/160
4,372,115 A * 2/1983 Rauch .................. F02G 1/0435
60/517
(Continued)

FOREIGN PATENT DOCUMENTS

DE         19823716 A1    12/1999
DE      102009023971 A1   12/2010
(Continued)

OTHER PUBLICATIONS

Machined translation of DE-102009023971 (Description only).*
(Continued)

*Primary Examiner* — Robert A. Siconolfi
*Assistant Examiner* — San M Aung
(74) *Attorney, Agent, or Firm* — Scully Scott Murphy and Presser

(57) ABSTRACT

A compensating oscillation device (2) for a linear piston system (1) is mentioned that comprises a housing (4), at least two coupling elements (10) and a inertial mass (8) that is coupled to the housing (4) by means of each coupling element (9) and is able to be deflected along an axis (7), wherein each coupling element (9) is attached on the housing (4) at at least one respective attachment region (26, 28) and to the inertial mass (8) at at least one respective connection region (18, 20). For this purpose it is provided that on each of the at least two coupling elements (9) the at least one connection region (18) to the inertial mass (8) lies radially closer to the axis (7) than the at least one attachment region (26) to the housing (4), and that in the rest state the inertial mass (8) is disposed between two coupling elements (9) in the axial direction. Moreover, a linear piston system (1) with a linearly displaceably supported piston (40) and a
(Continued)

Figure 1:
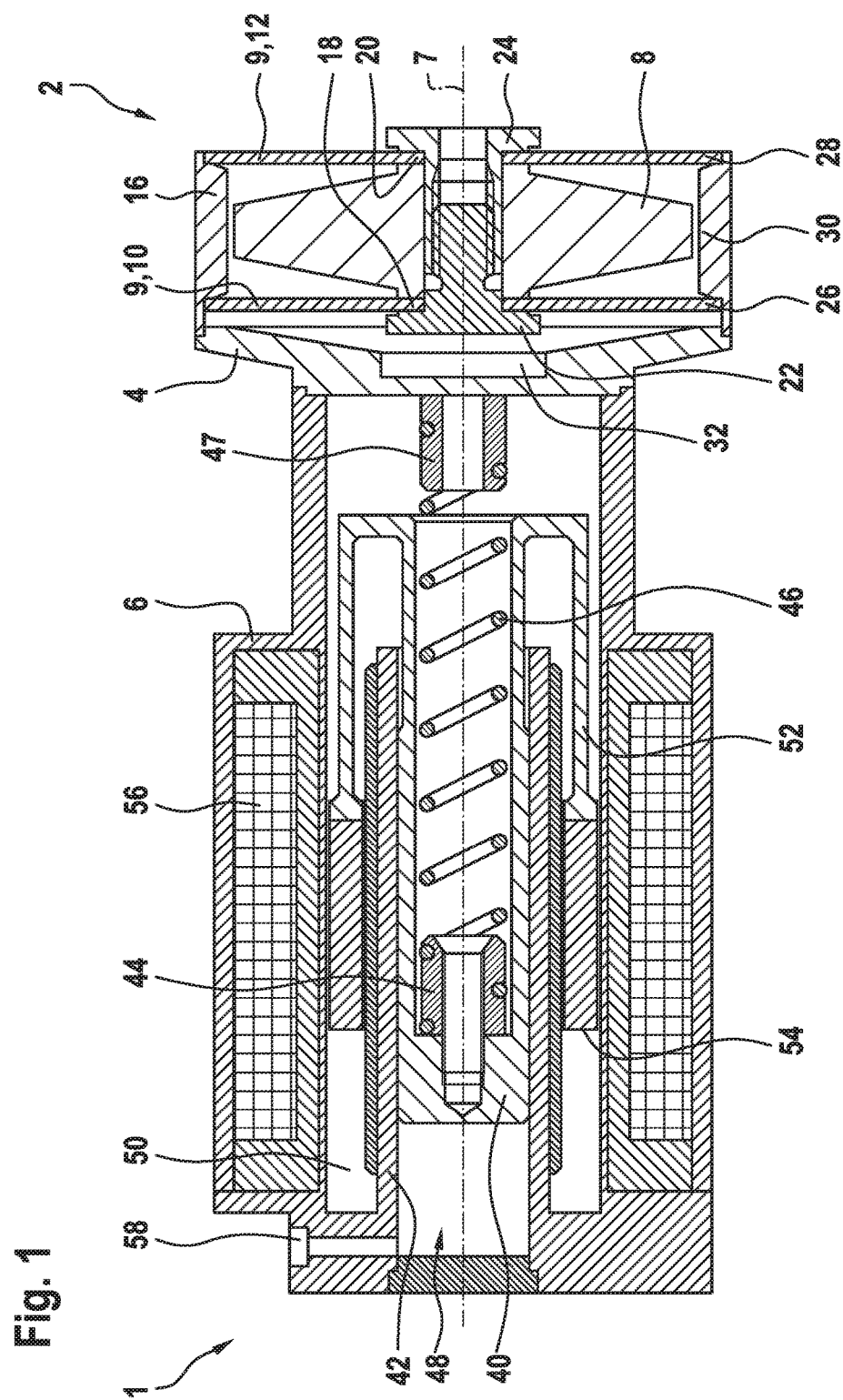

compensating oscillation device (2) of said type are mentioned.

9 Claims, 2 Drawing Sheets

(58) Field of Classification Search
CPC . F16F 3/12; F16F 15/02; F16F 15/022; F02G 1/0435; F02G 2280/10; F02G 1/043; F02G 1/053; F02G 2275/10; B63H 21/302; B64G 1/22; F25B 9/14; F25B 2500/13
USPC ...................................... 188/380; 267/140.11
See application file for complete search history.

(56) References Cited

U.S. PATENT DOCUMENTS

| | | | | |
|---|---|---|---|---|
| 4,922,159 | A * | 5/1990 | Phillips | B64G 1/22 |
| | | | | 244/164 |
| 5,895,033 | A | 4/1999 | Ross et al. | |
| 6,305,675 | B1 * | 10/2001 | Muramatsu | B06B 1/045 |
| | | | | 267/140.14 |
| 6,991,077 | B2 * | 1/2006 | Maeno | F16F 7/108 |
| | | | | 188/378 |
| 2002/0121816 | A1 | 9/2002 | Qiu et al. | |
| 2003/0111311 | A1 * | 6/2003 | Saito | F16F 7/116 |
| | | | | 188/380 |
| 2004/0195742 | A1 * | 10/2004 | Wood | F16F 7/1011 |
| | | | | 267/140.14 |
| 2004/0221576 | A1 * | 11/2004 | Lynch | F02G 1/043 |
| | | | | 60/517 |
| 2006/0254270 | A1 * | 11/2006 | Tanaka | F02G 1/043 |
| | | | | 60/517 |
| 2009/0007560 | A1 * | 1/2009 | Inoshiri | F16F 1/326 |
| | | | | 60/517 |

FOREIGN PATENT DOCUMENTS

| | | |
|---|---|---|
| EP | 0 553 818 A1 | 1/1993 |
| EP | 1780440 A1 | 5/2007 |
| FR | 258866 A1 | 7/1998 |
| WO | 2010/139328 A1 | 12/2010 |

OTHER PUBLICATIONS

International Search Report dated Oct. 16, 2014 issued in PCT/EP2014/001664.
English Abstract of WO 10/139328 A1, dated Dec. 9, 2010.
Notification of Reason for Rejection issued in corresponding Japanese Patent Application No. 2016-522308 dated Jul. 3, 2018.

* cited by examiner

COMPENSATING OSCILLATION DEVICE

The invention concerns a compensating oscillation device for a linear piston system, comprising a housing, at least two coupling elements and an inertial mass that can be deflected along an axis and that is coupled by means of each coupling element to the housing, wherein each coupling element is attached to at least one respective attachment region on the housing and respectively to at least one respective connection region on the inertial mass. Moreover, the invention concerns a linear piston system with such a compensating oscillation device.

High power infrared sensors usually only achieve the desired electrooptical properties, such as for example the signal-to-noise ratio, at low temperatures significantly below the ambient temperature. The temperatures mostly lie in a range between 80K and 200K. For the cooling of such sensors, cryogenic coolers are preferably used that mostly operate according to the Stirling process. In said process a coolant, mostly the working gas helium, passes through a periodic pressure oscillation. The pressure change can be achieved by means of a compressor with one or more displaceable working pistons. A relevant drive mechanism of the piston or pistons for this is in particular a linear drive. The compressors used are configured without valves, so that the frequency of the motor or piston displacement corresponds to the frequency of the pressure change. As a result of the axial displacement of the linear motors together with configured without valves, so that the frequency of the motor or piston displacement corresponds to the frequency of the pressure change. As a result of the axial displacement of the linear motors together with the driven pistons, forces arise that are transferred from the housing of the compressor by means of the mechanical attachment to a connected system. In the case of two oppositely operating pistons, the forces, which manifest themselves as vibrations, are caused by greater or lesser differences in the two halves of the drive in relation to properties such as motor efficiency, friction or displaced mass. In the case of single piston compressors, the vibrations can be very pronounced because there is no compensation of the forces between two halves of the drive.

In order to reduce the vibrations caused by the piston displacement, in a linear piston cooler a passive compensation oscillator that is elastically coupled to the piston or its housing is often used that is intended to compensate the vibrations of the piston displacement.

In U.S. Pat. No. 5,895,033 A a compensating oscillation device for a linear piston system is described, in which an annular inertial mass is coupled at its internal diameter by means of two flat or membrane spring arrangements to a central mounting bolt, wherein the piston displacement preferably has to take place along the axis of the ring. In this case the mounting bolt can be externally mounted on the housing of the piston or on the inner wall of a capsule that is to be screwed onto the housing of the piston. In order to increase the stability of the arrangement, one or more helical or spiral springs can also be provided, being clamped between the inertial mass and the housing wall or between the inertial mass and a flange on the free end of the bolt.

In the case of an arrangement outside of the housing, the annular inertial mass is disadvantageously exposed to possible shocks that can adversely affect the vibration-damping effect of the mass. In addition, because of the annular mass distribution and the radial coupling to the mounting bolt, in cases of vibrations the undesirable possibility arises that the oscillations no longer only take place along the axis of the ring, but are tilted relative thereto. This is also a disadvantage in relation to the operation of the compensating oscillation device.

Consequently, it can also be a disadvantage in the case of a very compact design to protect the inertial mass against shocks by means of any additional components, such as a further spring element or a capsule.

In US 2002/0121816 A1 a compensating oscillation device is mentioned in which a bar with two inertial masses attached to its ends as with a dumbbell, is coupled to a housing by means of two spring arrangements that engage the bar between the two inertial masses. Magnetisable plates are introduced on the bar between the two spring arrangements and magnets are introduced in the housing, so that a linear motor is formed thereby, by means of which the compensating oscillation device can be actively operated. Passive operation of the compensating oscillation device is not mentioned in detail.

In DE 10 2009 023 971 A1 a compensating oscillation device for a linear piston system is presented, in which an inertial mass is directly coupled by means of a spring arrangement to a bar that is rigidly connected to the piston and is connected by means of further spring arrangements to the housing of the linear piston system. The connection to the piston by means of the bar is essential for functionality, requiring realignment of the compensating oscillation device as a whole in the event of structural changes only concerning the piston.

The object of the invention is thus to specify a passive compensating oscillation device in which the inertial mass is highly insensitive to shocks and vibrations in a compact and simple design. Moreover, an advantageous application for such a compensating oscillation device will be indicated.

The first-mentioned object for a compensating oscillation device for a linear piston system, comprising a housing, at least two coupling elements and an inertial mass and that is coupled to the housing by means of each coupling element and that can be deflected along an axis, wherein each coupling element is attached to at least one respective attachment region on the housing and to at least one respective connection region on the inertial mass, is achieved according to the invention by the at least one respective connection region to the inertial mass on the at least two coupling elements lying radially closer to the axis than the at least one attachment region to the housing, and by the inertial mass being disposed between two coupling elements in the axial direction when in the rest state.

An inertial mass forms the conceptual starting point in this case, being able to be stimulated to linear oscillations along an axis. The axis is hereby defined by the displacement of the centre of gravity of the inertial mass, and coincides with the axis of the ring in the case of an essentially annular mass distribution.

An arrangement of the inertial mass between two coupling elements in the rest state should signify here that the compensating oscillation device comprises two coupling elements that are spaced apart axially from each other, and at least the significant mass component and at least the significant volume component of the inertial mass are concentrated between their connection regions. In particular, a mass distribution is also included here that extends close to the axis on both sides of a connection region of a coupling element, for example by means of a connection device such as a bolt or a flange.

In a first step the invention is based on the assumption that by coupling the inertial mass to the housing inwards to the axis, unwanted tilting oscillations about a further axis perpendicular to the desired oscillation axis can be stimulated because of the off-axis mass concentration. A change of the geometry of the inertial mass while simultaneously maintaining the coupling inwards to the axis could reduce the number of possible stimulation modes, but not effectively suppress remaining oscillations resulting from the pendulum arrangement. A possible increase in the stiffness of the coupling, for example as a result of increased spring constants for the coupling by means of spring elements, would also adversely affect the desired oscillation by a change of the resonant frequency and can therefore not be useful for preventing unwanted oscillations.

In a second step the invention recognizes that the oscillation axis can be stabilized against possible tilting by the inertial mass being externally connected in at least one region. An external connection should mean here that an attachment to the housing for one coupling element lies radially further outwards than a connection of the corresponding coupling element to the inertial mass. The inertial mass is thus held radially from the outside relative to the oscillation axis by the relevant coupling elements. An external connection of a coupling element to the inertial mass also enables, at least in the immediate surroundings of the relevant connection region, a mass concentration closer to the axis compared to a centrally coupled annular mass distribution. As a result of forces being taken up in a radial direction in each case by a coupling element that is attached off-axis and whose connection region can be disposed on the outside of the inertial mass, no coupling is necessary close to the axis in the corresponding radial direction. Thus mass components can be disposed closer to the oscillation axis in the relevant region. As a result of the higher concentration of the mass in the region of the oscillation axis, the oscillation axis is additionally stabilized against possible tilting in the event of vibrations.

Such a connection by means of a plurality of coupling elements enables particularly axially stable coupling of the inertial mass here. It is advantageous here that the center of mass of the inertial mass is disposed between two coupling elements in the axial direction in the rest state. As a result the oscillation axis is particularly effectively protected against tilting in the direction of the action of the force on the coupling elements. In particular, both coupling elements can each be of rotation symmetrical form, so that the action of the force on each of the two coupling elements essentially takes place radially symmetrically, and thus tilting of the oscillation axis in any azimuthal direction is made particularly difficult.

In a third step the invention recognizes that in addition off-axis mounting of the coupling elements can be configured such that the attachment region on the housing protects the inertial mass against shocks. As a result of the fact that the attachment region of the corresponding coupling element to the housing is further from the axis in the radial direction than the connection region to the inertial mass, the housing can enclose the inertial mass radially from the outside in the surroundings of the corresponding attachment region and can thus protect the inertial mass against shocks from a certain spatial direction. In particular, the option of a completely external coupling is possible here, i.e. that each connection region of a coupling element to the inertial mass lies radially closer to the axis than each attachment region of the corresponding coupling element to the housing. In this case a wall of the housing can fully enclose the inertial mass in the azimuthal direction and hence protect against essentially radial contacts or direct impacts from any direction.

It has proved to be advantageous if each coupling element couples the inertial mass essentially rigidly in a plane perpendicular to the axis. The oscillation axis can be effectively stabilized by means of a restriction of the radial degrees of freedom.

In an advantageous embodiment each connection region of a coupling element to the inertial mass lies radially closer to the axis than each attachment region of the corresponding coupling element to the housing. Preferably, this arrangement can apply separately to each coupling element that is present. In particular, the relevant coupling elements can hereby be disposed in an annular disk shape or disposed spoke-like about the inertial mass. As a result of said arrangement, the inertial mass is connected to the relevant coupling elements on the outside and is thus held on the oscillation axis by the same from the outside, the oscillation axis being particularly stable against tilting as a result. Moreover, in the case of fully outside coupling of the inertial mass, the mass distribution can be concentrated densely about the axis apart from possible connection bores. As a result the inertial mass is additionally sluggish in response to stimulation of unwanted tilting oscillations.

Advantageously, each coupling element is attached to the inertial mass at the or each connection region by welding and/or bolting and/or gluing and/or clamping (in particular by an elastic pretension in the parts involved or even in an additional spring element), and/or is attached to the housing at the or each attachment region by welding and/or bolting and/or gluing and/or clamping. By a connection of said type between the coupling element and the housing or between the coupling element and the inertial mass, a coupling element can be fixed in the radial and azimuthal direction in a simple manner, whilst the axial elasticity remains guaranteed.

Advantageously, each coupling element is in the form of a spring element that is elastic in the axial direction. By the embodiment of each coupling element as a spring element, a target axial elasticity can be particularly simply set by means of the spring rate.

It has further proved favorable if the housing and/or the inertial mass are essentially of a rotation symmetrical form. An essentially rotation symmetrical form should comprise inevitable manufacturing inaccuracies here as well as axial bores necessary for assembly, connection or attachment, which result in detail in a deviation from a rotation symmetrical form. With an embodiment of the inertial mass of this nature, the oscillation axis is very stable against tilting because of the absence of a preferred azimuthal direction. A suitable adaptation of the shape of the housing to the shape of the inertial mass simplifies the attachment of a coupling element to the housing as well as its connection to the inertial mass. In particular, a rotation symmetrical housing can effectively shield the inertial mass against shocks from any radial direction.

The axial length of the inertial mass preferably decreases monotonically with increasing radial distance from the axis. The axial length of the inertial mass is to be understood to mean the distance between two points lying opposite each other on the axially outermost surface of the inertial mass at the same radial distance and at the same azimuth angle relative to a reference point, wherein said points are to be selected such that they do not coincide with possible axial bores for mounting elements. The mass distribution is concentrated very close to the axis as a result of this, which imparts to the oscillation axis an increased inertia against stimulation of unwanted tilting oscillations.

Advantageously, each coupling element is essentially of a rotation symmetrical form, i.e. apart from inevitable manufacturing inaccuracies as well as configurations necessary for assembly, connection or attachment, such as for example axial bores. This includes in particular an embodiment in the form of a spoke wheel or an annular disk with spiral incisions. By means of a rotation symmetrical form, radial forces are absorbed highly uniformly by each coupling element, and hence the oscillation axis is effectively stabilized against vibrations.

In a further advantageous version, in the rest state of the inertial mass each coupling element couples said mass to the housing in the radial direction, i.e. each coupling element is essentially perpendicular to the axis in the rest state of the inertial mass. As a result of this, a coupling element can particularly effectively absorb radial forces on the inertial mass and hence keep the desired oscillation axis stable.

It has further proved favorable if the inertial mass is enclosed by the housing in the radial direction and the housing is closed with a cover in an axial direction. The inertial mass is thus provided with mechanical protection of the displaced oscillator against external contact, wherein at the same time a compact construction is enabled.

The object mentioned second is achieved according to the invention by a linear piston system comprising a linearly displaceable piston and a compensating oscillation device of the type described above. The advantages of the compensating oscillation device and its developments can thereby be transferred analogously to the linear piston system.

For this the piston is preferably introduced into the housing of the compensating oscillation device so as to be displaceable in the axial direction in relation to the axis of the compensating oscillation device. In particular, the axes of the displacements of the centers of gravity of the piston and inertial mass can coincide here. An arrangement with the piston and inertial mass in the same housing enables a particularly compact construction, in which moreover the inertial mass can be effectively protected against shocks by the wall of the housing. In particular, the coaxial mounting of the piston and the inertial mass, i.e. an arrangement in which the center of gravity of the piston and the center of gravity of the inertial mass can move on the same axis, provides for advantageous compensation by the compensating oscillation device of the vibration produced by the piston displacement.

The piston in the housing is preferably in the form of a working piston of a compressor. Said compensating oscillation device is particularly suitable for compensating the forces occurring during the displacement of a compressor piston. In other words, the compensating oscillation device is used for a linear compressor system as is used for cooling high power infrared sensors.

Figure 2:
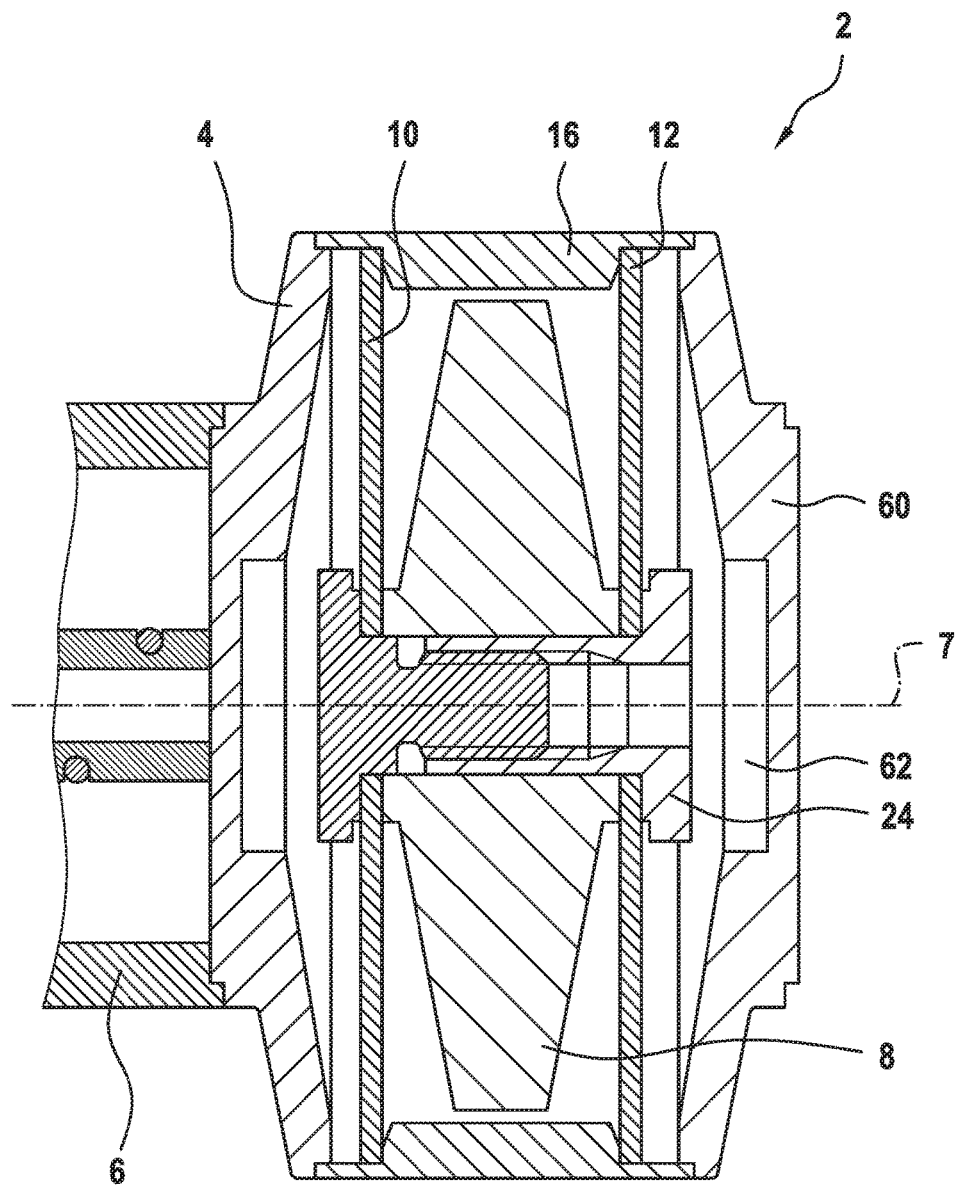

An exemplary embodiment of the invention is described using figures. In the figures:

FIG. 1 shows a linear piston system with a coaxially disposed compensating oscillation device in a cross-sectional representation, and FIG. 2 shows a compensating oscillation device with a cover disposed on the housing in a cross-sectional representation.

In FIG. 1 a linear piston system 1 with a compensating oscillation device 2 is shown in cross-section. In the exemplary embodiment the linear piston system 1 is in the form of a single piston cryogenic cooler. The housing 4 of the compensating oscillation device 2 is fixedly joined to the outer housing 6 of the linear piston system 1. An inertial mass 8 that is rotationally symmetrical relative to the axis 7 is mounted in the housing 4 so as to be axially displaceable and comprises an essentially trapezoidal generating surface. The inertial mass 8 is coupled by means of two coupling elements 9 in the form of diaphragm springs 10, 12 to a cylindrical attachment 16 belonging to the housing 4. Here the diaphragm springs 10, 12 are connected to the inertial mass 8 in their respective connection regions 18, 20 by means of two fixing bolts 22, 24 that are screwed together. The diaphragm springs 10, 12, which enclose a peripheral ring 30 in the cylindrical attachment 16 from both sides, are attached to the housing 4 at the attachment regions 26, 28. In the rest state of the inertial mass the diaphragm springs 10, 12 are essentially perpendicular to the axis 7, so that the connection regions 18, 20 of the diaphragm springs 10, 12 on the inertial mass 8 lie radially closer to the axis 7 than the attachment regions 26, 28 of the diaphragm springs 10, 12 to the housing 4. A cutout 32 for the fixing bolt 22 is provided in the housing 4 to allow deflection of the inertial mass 1 in the direction of the axis 7.

In the outer housing 6 of the linear piston system 1 a piston 40 is introduced into a cylinder 42 so as to be displaceable along the axis 7. For this the piston 40 is joined by means of a mounting bolt 44 to a coil spring 46 that is joined to the housing 4 of the compensating oscillation device 2 in the axial direction by means of a further mounting bolt 47. The piston 40 is forced by the coil spring 46 into a chamber 48 in the cylinder 42. There is an annular gap 50 around the cylinder 42 in the outer housing 6. This is engaged by a cylindrical wall 52 that is joined to the piston 40 at the end opposite the chamber 48 and on which a peripheral magnetized ring 54 is placed in the annular gap 50. A number of solenoids 56 are introduced around said magnetized ring 54 in the outer housing 6. The magnetized ring 54 and the solenoids 56 are configured to drive the piston 40 to linear oscillations along the axis 7. The chamber 48 is connected by means of a duct 58 to a cold finger that is not shown in detail in the figure. The piston 40 is in the form of a working piston of a compressor.

Vibrations that are transferred by the periodic displacement of the piston 40 to its outer housing 6, and hence to the housing 4 of the compensating oscillation device 2, can now be at least partly compensated by the inertial mass 8 of the compensating oscillation device 2 through the connection by means of the diaphragm springs 10, 12. The radial external attachment of the diaphragm springs 10, 12, i.e. the arrangement of radially farther outlying attachment regions 26, 28 and radially further inward lying connection regions 18, 20 to the inertial mass 8, provides high stability of the axis 7 against possible vibrations here. This is further increased by the concentration of the mass distribution of the inertial mass 8 about the axis 7 and an accompanying, further improved inertia against tilting.

An alternative compensating oscillation device to FIG. 1 2 with a cover 60 disposed on the housing 4 is shown in cross-section in FIG. 2. In this case the inertial mass 8 is again coupled to the cylindrical attachment 16 of the housing 4 by means of diaphragm springs 10, 12. Along the axis 7, the housing 4 is fixedly joined to the outer housing 6 of a piston that is not shown in detail in the figure. The cover 60 seats the housing 4 on the cylindrical attachment, opposite to the connection to the outer housing of the piston 40 relative to the inertial mass 8. Facing the inertial mass 8, a cutout 62 for the fixing bolt 24 enabling deflection of the inertial mass 8 is provided in the cover 60. The inertial mass 8 is protected against external contact by the cover 60.

REFERENCE CHARACTER LIST 1 linear piston system
2 compensating oscillation device 4 housing
6 outer housing of the linear piston system
8 inertial mass
9 coupling element
10 diaphragm spring
12 diaphragm spring
16 cylindrical attachment of the housing
18 connection region
20 connection region
22 fixing bolt for connection
24 fixing bolt for connection
26 attachment region
28 attachment region
30 peripheral ring
32 cutout for fixing bolt
40 piston
42 cylinder
44 mounting bolt
46 coil spring
47 mounting bolt
48 chamber
50 annular gap
52 cylindrical wall
54 magnetized ring
56 solenoid
58 duct
60 cover
62 cutout for fixing bolt

The invention claimed is:

1. A linear piston system comprising:
a piston supported to be linearly displaceable within a housing of the linear piston system; and
a compensating oscillation device configured to compensate vibrations generated by the piston, wherein the compensating oscillation device comprises:
a housing having an inside,
at least two coupling elements, wherein the at least two coupling elements are directly attached to the inside of the housing, and
an inertial mass coupled to the housing by the at least two coupling elements, such that the inertial mass is deflectable along an axis, wherein each coupling element comprises at least one attachment region and at least one connection region, wherein each coupling element is attached to the inside of the housing through the at least one attachment region and is connected to the inertial mass through the at least one connection region,
wherein on the at least two coupling elements, the respective at least one connection region lies radially closer to the axis than the respective at least one attachment region, and wherein in the rest state, the inertial mass is disposed between two coupling elements of the at least two coupling elements in the axial direction,
wherein the inertial mass is only provided within the housing of the compensating oscillation device and the piston is only provided within the housing of the linear piston system, wherein the housing of the compensating oscillation device and the housing of the linear piston system axially abut each other, such that the inertial mass and the piston are not directly coupled to each other,
wherein the compensating oscillation device is a passive compensating oscillation device that works only with restoring forces generated by the at least two coupling elements,
wherein the axial length of the inertial mass decreases monotonically and radially away from the axis, such that the mass distribution of the inertial mass is concentrated toward the axis,
wherein the piston is linearly displaceable within the housing of the linear piston in the axial direction,
wherein the piston comprises a working piston of a compressor, and
wherein each coupling element of the at least two coupling elements is connected to both the inertial mass and the housing of the compensating oscillation device by elastic pretension.

2. The compensating oscillation device as claimed in claim 1, wherein the inertial mass is substantially rigidly connected in a plane perpendicular to the axis.

3. The compensating oscillation device as claimed in claim 1, wherein each respective connection region of a coupling element of the at least two coupling elements to the inertial mass lies radially closer to the axis than each respective attachment region of the coupling element to the housing.

4. The compensating oscillation device as claimed in claim 1, wherein each coupling element of the at least two coupling elements is in the form of a spring element that is elastic in the axial direction.

5. The compensating oscillation device as claimed in claim 1, wherein each coupling element of the at least two coupling elements is connected to the inertial mass and the housing by at least one of welding, bolting, gluing and clamping.

6. The compensating oscillation device as claimed in claim 1, wherein at least one of the housing and the inertial mass are of substantially rotationally symmetrical form.

7. The compensating oscillation device as claimed in claim 1, wherein each coupling element of the at least two coupling elements is of substantially rotationally symmetrical form.

8. The compensating oscillation device as claimed in claim 1, wherein in the rest state of the inertial mass, each coupling element of the at least two coupling elements couples the inertial mass to the housing in the radial direction.

9. The compensating oscillation device as claimed in claim 1, wherein the inertial mass is enclosed by the housing in the radial direction and the housing is closed by a cover in an axial direction.

* * * * *